United States Patent
Golla et al.

(10) Patent No.: US 11,537,505 B2
(45) Date of Patent: Dec. 27, 2022

(54) FORCED DEBUG MODE ENTRY

(71) Applicant: Cadence Design Systems, Inc., San Jose, CA (US)

(72) Inventors: Robert T. Golla, Austin, TX (US); Matthew B. Smittle, Allen, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/173,127

(22) Filed: Feb. 10, 2021

(65) Prior Publication Data

US 2022/0121557 A1    Apr. 21, 2022

Related U.S. Application Data

(60) Provisional application No. 63/092,974, filed on Oct. 16, 2020.

(51) Int. Cl.
| | |
|---|---|
| *G06F 11/00* | (2006.01) |
| *G06F 11/36* | (2006.01) |
| *G06F 11/30* | (2006.01) |
| *G06F 11/07* | (2006.01) |
| *G06F 11/14* | (2006.01) |

(52) U.S. Cl.
CPC ...... *G06F 11/3656* (2013.01); *G06F 11/0757* (2013.01); *G06F 11/1474* (2013.01); *G06F 11/3027* (2013.01); *G06F 11/366* (2013.01); *G06F 11/3664* (2013.01)

(58) Field of Classification Search
CPC .. G06F 11/3664; G06F 11/273; G06F 11/362; G06F 11/3656
See application file for complete search history.

(56) References Cited

U.S. PATENT DOCUMENTS

| | | | |
|---|---|---|---|
| 5,964,893 A * | 10/1999 | Circello | G06F 11/3648 714/39 |
| 9,514,070 B2 | 12/2016 | Sato et al. | |
| 10,261,885 B2 | 4/2019 | Tucker et al. | |
| 10,891,207 B2 | 1/2021 | Bhatia et al. | |
| 2005/0268195 A1 * | 12/2005 | Lund | G06F 11/3648 714/741 |
| 2014/0281695 A1 * | 9/2014 | Kraipak | G06F 11/0766 714/10 |

* cited by examiner

*Primary Examiner* — Charles Ehne
(74) *Attorney, Agent, or Firm* — Mark H. Whittenberger; Holland & Knight LLP

(57) ABSTRACT

The present disclosure is directed to a mechanism for forcing a processor to enter a debug mode. In one embodiment, a processor includes a logic circuit configured to receive a halt request. In response to receiving the halt request while the processor is not in a quiescent state, the logic circuit forces the processor into the quiescent state after a threshold amount of time has elapsed. Processor operation is then halted, and the processor thus becomes accessible for a debugger to perform debug operations.

17 Claims, 7 Drawing Sheets

FORCED DEBUG MODE ENTRY

RELATED APPLICATION

The present application claims priority to U.S. Provisional Appl. No. 63/092,974, filed Oct. 16, 2020, the disclosure of which is incorporated by reference herein in its entirety.

BACKGROUND

Technical Field

This disclosure is directed to processors, and more particularly, to mechanisms for debugging processors.

Description of the Related Art

Hardware debug circuitry may be used in various scenarios to detect and correct processor issues. Using debug circuitry within a processor, along with an external debugger, various aspects of the internal state of a processor (e.g., contents of general purpose registers, control/status registers) can be accessed to aid in determining the cause of problems that occur during operation. This in turn may be used in activities such as design verification, assessing software issues, and so on.

Using a debugger, a user may provide inputs that cause a debug command to be sent to the debug circuitry internal to the processor. The debug circuitry may issue a halt command that then causes processor operation to be stopped. Thereafter, the debugger can access the internal state of the processor as it was as the time processor operation was stopped.

SUMMARY

The present disclosure is directed to a mechanism for forcing a processor to enter a debug mode. In one embodiment, a processor includes a logic circuit configured to receive a halt request. In response to receiving the halt request while the processor is not in a quiescent state, the logic circuit forces the processor into the quiescent state after a threshold amount of time has elapsed. Processor operation is then halted, and the processor thus becomes accessible for a debugger to perform debug operations.

In one embodiment, the halt request is asserted by a debug circuit internal to the processor. Since the processor may be waiting for pending transactions to finish when the halt request is asserted, the debug circuit may cause a timer to begin running to track the amount of time that has elapsed from the assertion of the request. The length of the timer may be programmable in various embodiments. In some cases, the length of the timer may correspond to an expected maximum amount of time for a transaction to be completed. Upon the timer indicating that the threshold has been reached, a logic circuit (e.g., a retirement logic circuit) may force the processor to halt operation, which may include canceling pending transactions and resetting any corresponding bus interface units. Thereafter, an acknowledgment is sent to the debug circuit. The debug circuit may then perform debug operations, which may include accessing the internal state of the processor and providing information therefrom to an external debugger. In this manner, if a pending transaction is waiting on a transaction or other operation to complete when the halt is requested, canceling these transactions/operations may ensure that the processor will not be stuck in a mode where operation in the debug mode is inhibited.

BRIEF DESCRIPTION OF THE DRAWINGS

The following detailed description makes reference to the accompanying drawings, which are now briefly described.

DETAILED DESCRIPTION OF EMBODIMENTS

Figure 1A:
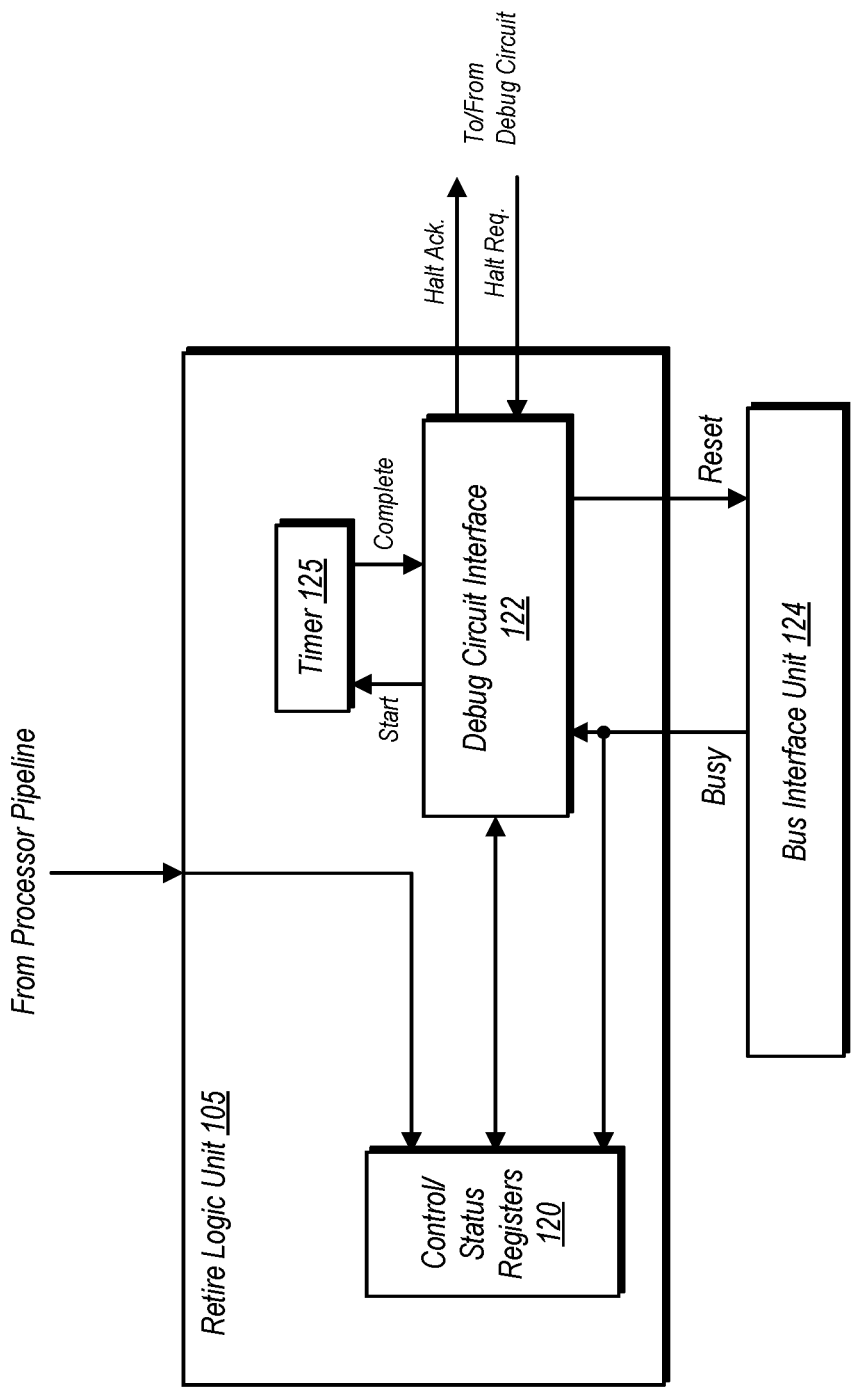
FIG. 1A is a block diagram of a portion of one embodiment of a processor.

The present disclosure is directed to forcing a processor into a quiescent state to enable entry into a debug mode. As defined herein, a "quiescent state" is a state in which the processor is not waiting for the completion of any pending transactions or acknowledgments of any completed transactions or other operations. At various times during operation, when a fault is present, a processor may "hang", or cease operation. This can be caused by various reasons, such as transactions that are initiated but never completed. During these times, the processor is not considered to be in a quiescent state.

Many processors implement debug circuitry that provides access to the internal state (e.g., contents of various internal registers) to gain access to information that is useful to evaluate processor functionality. When operating in a debug mode, the debug circuitry is able to obtain control of the internal operation of the processor. The debug circuitry may interface with an external debugger such as a JTAG (Joint Test Action Group) interface.

Entry into the debug mode typically requires that a processor be in a quiescent state. But as noted above, a processor may commonly not be able to reach a quiescent state if it hangs while transactions are pending. The inability to enter debug mode in these scenarios can severely limit the ability to determine the root cause that led to the processor hanging. To clear the problem, the only option may be to reset the processor entirely, thereby causing a loss of the internal state and thus an inability to determine the cause of the problem.

When a processor hangs with transactions pending, such transactions are not likely to complete if they have not done so in a certain amount of time. Accordingly, the present disclosure contemplates techniques for forcing a processor into a quiescent state in these situations. In various embodiments, if a processor hangs with pending transactions or other conditions that prevent entry into a quiescent state, a timer is initiated. This may be performed in some embodiments by a retire logic circuit in response to receiving a halt request. The timer may be programmed with a threshold value indicative of an amount of time after which a pending transaction is unlikely to complete. If the time threshold is reached without the processor entering the quiescent state, the retire logic circuit may cancel any pending transactions, thus allowing the processor to transition into a quiescent state. Cancellation of the pending transactions may include, for example, resetting one or more bus interface units that are involved in the transaction. Upon completing the cancellation of the transactions and forcing the processor into the quiescent state, the retire logic unit may halt operation of the processor send an acknowledgement of the same to the debug circuitry. Thereafter, the debug circuitry may enter the debug mode, gaining full access and control of the internal operation of the processor.

The method and apparatus embodiments described herein may advantageously allow access to the processor internal state in situations such as those described above. This may significantly enhance the ability to debug problems associated with processor malfunctions resulting from, or concurrent with, transactions that fail to complete. For example, using the method and apparatus described herein, forced entry into a quiescent state and entry into the debug mode may allow a view of the internal state of the processor at the time a malfunction occurred because of or concurrent with a pending transaction that failed to complete.

FIG. 1A is a block diagram of a portion of a processor. In the embodiment shown, a retire logic unit 105 and a bus interface unit 124 of a processor are illustrated. In the embodiment shown, retire logic unit 105 includes circuitry that may be implemented at the end of an instruction pipeline, and may be perform various functions. These functions include, but are not limited to, retiring executed instructions, committing instruction results to registers, storing results of executed instructions to registers, and so on. Although not explicitly shown here, retire logic unit 105 may include various circuit elements arranged to carry out these functions. Generally speaking, retire logic unit 105 may control internal operation of the processor in which it is implemented during normal operational modes.

Retire logic 105 in the embodiment includes a debug circuit interface 122. As will be discussed in further detail below, debug circuit interface 122 may interface with a debug circuit also implemented in the processor. Through debug interface 122, a debug circuit may send commands and other information into retire logic unit 105 during the performance of debug operations. Information extracted during debug operations, such as register states, internal circuit states, and so on, may also be sent through debug interface 122 back to the debug circuit. In the embodiment shown, debug circuit interface 122 is also coupled to receive a halt request signal ('Halt Req.') from the debug circuit and is further coupled to convey a halt acknowledgement ('Halt Ack.') signal back to the debug circuit.

The halt request may be sent by the debug circuit when it is desirable to halt normal processor operations to perform debug operations. 'Normal operations' may be defined as those operations performed by the processor in accordance with its intended function(s), when internal operation of the processor is not controlled by a debug circuit (e.g., controlled by retire logic unit 105). 'Debug operations' may be defined as operations carried out by a debug circuit and with the processor operation under control of the debug circuit.

Assertion of the halt request may be performed for various reasons. For example, it may be desirable in some instances to monitor the internal states of a processor as a program executes. It may further be desirable to enter the debug mode when the processor 'hangs', e.g., when the processor ceases to continue to execute instructions and/or process transactions. When this occurs, entry into the debug mode may allow a debug circuit, via debug circuit interface 122, to access information from within the processor, including internal register states and other information that may provide insight as to the cause of the fault.

Debug circuit interface 122 in the embodiment shown is coupled to a group of control and status registers 120. These registers may store information regarding the internal status of the processor, which may include the status of pending instructions, pending transactions, and so on. Control information may also be stored in some of these registers. Examples of various registers pertaining to this disclosure are discussed in further detail below, and illustrated in Tables 1 and 2. In addition to being coupled to debug circuit interface 122, control and status registers 120 are also coupled to a bus interface unit 124, and additionally, are coupled to a processor pipeline (not shown here for simplicity). Information from these sources may be used to update the contents of various ones of the registers in control and status registers 120.

In the embodiment shown, debug circuit interface 122 is also coupled to the bus interface unit 124. As illustrated here, bus interface unit 124 may be coupled to any type of bus, such as a memory bus, a peripheral bus, and so on. In some embodiments (including various ones discussed below), multiple bus interface units may be present in accordance with a type of bus and/or a type of information conveyed. Bus interface unit 124 in the embodiment shown may assert a Busy signal when a transaction involving a corresponding bus is pending (e.g., incomplete). This signal may be received by both debug circuit interface 122 as well as by the control and status registers. As noted above, retire logic unit 105 may be unable to halt processor operation when the processor is not in a quiescent state. This may include instances when the Busy signal is asserted, indicating there are pending/incomplete transactions involving bus interface unit 124. However, in the embodiment shown, debug circuit 122 is configured to assert a Reset signal that is received by bus interface unit 124. When the asserted Reset signal is received by bus interface unit 124, any pending transactions may be canceled, which may allow the processor to enter the quiescent state and be halted.

Debug circuit interface 122 is also coupled to a timer 125. In the embodiment shown, timer 125 is a programmable timer that may be programmed to a particular value. When debug interface circuit 122 receives a halt requests when a transaction is pending (as indicated by assertion of the Busy signal), a Start signal may be asserted and received by timer 125. Responsive to receiving this signal, timer 125 may begin tracking the time since the request was received. If the timer reaches its programmed time (as indicated by assertion of the Complete signal) and transactions are still pending, debug interface circuit 122 may assert the Reset signal received by bus interface unit 124. This may cause cancellation of all pending transactions through bus interface unit 124, and may thus allow the processor to enter the quiescent state where operation can be halted. Upon completing the reset operation, debug circuit interface 122 may assert the acknowledgement signal ('Halt Ack.'), thereby acknowledging to the debug circuit that processor operation has been halted and operation in the debug mode may commence.

It is noted that in some instances, one or more incomplete transactions may complete while timer 125 is tracking the amount of time elapsed from a halt request. Assuming no other transactions are pending (or other conditions that would prevent a quiescent state), the completion of pending transactions while timer 125 is operating may allow retire logic unit 105 to halt processor operation and thus allow debug circuit interface 122 to assert the halt acknowledgement signal. Furthermore, if no transactions are pending when the halt request is received, or no other conditions are present that prevent the process from being in a quiescent state, the halt acknowledgement signal may be asserted without initiating operation of timer 125.

Figure 1B:
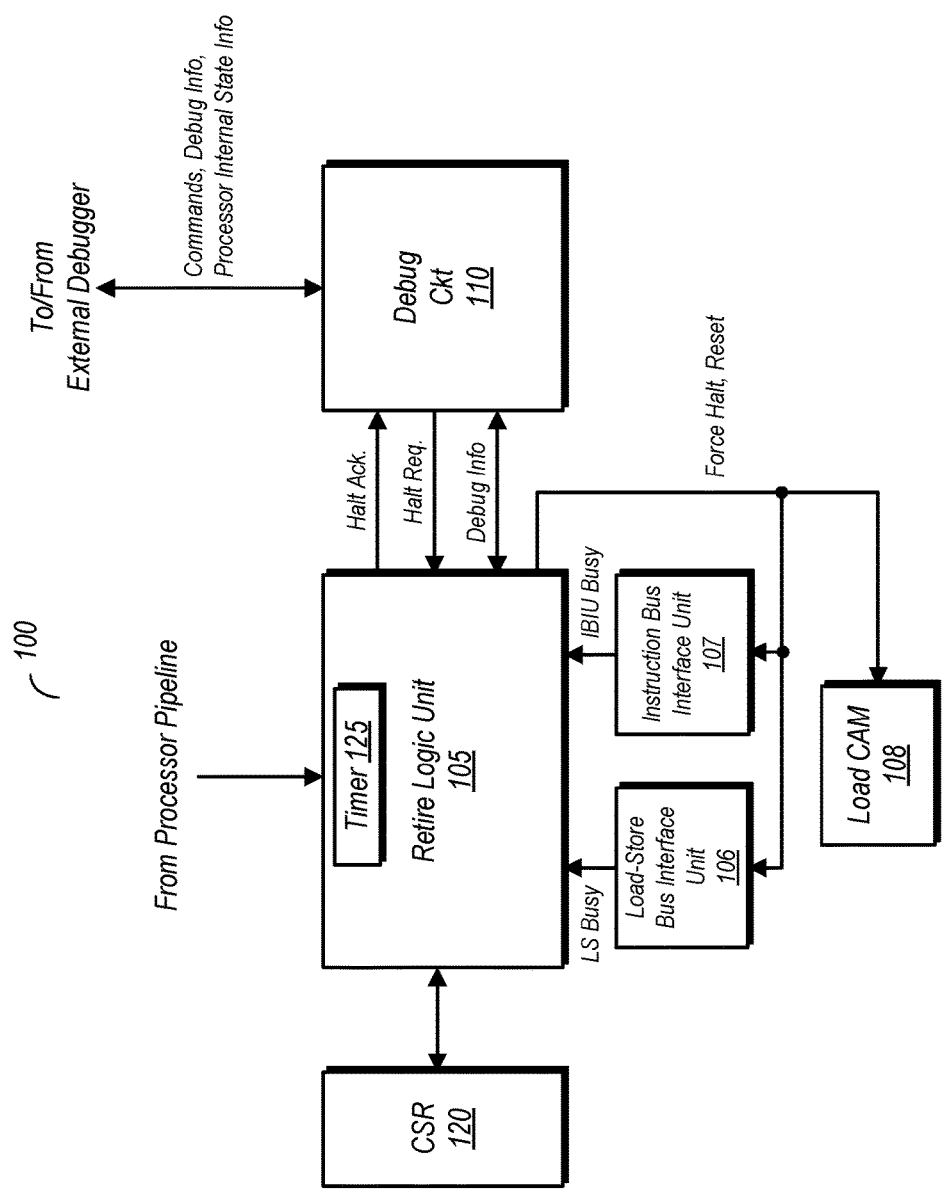
FIG. 1B is a block diagram of a portion of one embodiment of a processor.

FIG. 1B is a block diagram of another embodiment of a processor. Processor 100 of FIG. 1B is shown illustrating only some of the components of a processor, with additional components thereof to be discussed in further detail below. In the embodiment shown, processor 100 includes a retire logic unit 105, which may be implemented using circuitry coupled to the end of a processor execution pipeline (which is discussed in further detail below). Upon completion of the execution of instructions, an execution unit in the processor pipeline may provide results to retire logic unit 105, which may perform additional operations to retire the instructions. Generally speaking, the retire logic unit may manage the operating state of processor 100. This may include committing results of executed instructions to architected registers, committing information associated with store operations to memory, and so on. In performing debug operations, debug circuit 110 may exchange debug information with retire logic unit 105. This may include information that is to be relayed back to the external debugger (e.g., current processor state information) as well as information that is to be input into the processor (e.g., information to set the processor, or portion thereof, to a particular state).

Processor 100 further includes a set of control and status registers 120 which are coupled to retire logic unit 105. In some embodiments, these registers may be incorporated into the retire logic unit, although this is not required for the purposes of this disclosure.

Retire logic unit 105 is further coupled to a debug circuit 110, which may carry out debug operations within processor 100. Debug circuit 110 may be coupled to an external debugger via a debug interface, e.g., a JTAG (Joint Test Action Group) interface on processor 100. The external debugger can be executed by any suitable mechanism, such as a computer system that enables user input and can receive output from the processor. The external debugger may be used to input commands and information to debug circuit 110, and may also be used to receive internal processor information via debug circuit 110. The commands can include commands to halt internal processor operation, to perform single-step execution of instructions, and so on. The information received from debug circuit 110 may include internal processor state information, such as the contents stored in one or more internal registers.

Debug circuit 110 can request that the processor halt operation, via a halt request ('Halt Req.') signal, to enable operation in a debug mode. The halt request signal is provided to the retire logic unit 105, which may carry out the halt operation if the processor is in a quiescent state (e.g., no transactions are pending), and return an acknowledgement ('Halt Ack.') to the debug circuit. If the processor is not in a quiescent state, the halting of processor operations may be delayed, but may nevertheless be carried out by retire logic unit 105, as will be discussed further below.

Halting the processor operation may include discontinuing the further execution of instructions and generally discontinuing further operation. However, the processor may remain powered on when halted, with its current state being static. After processor 100 is halted and the acknowledgement signal received, debug circuit 110 may commence operations in a debug mode. These operations may aid a user of the external debugger in, e.g., determining the cause of a processor fault, troubleshooting software issues, general monitoring of internal processor operation, and so on.

Retire logic unit 105 is further coupled, in this particular embodiment, to a load-store bus interface unit (LS BIU) 106 and an instruction bus interface unit (IBIU) 107. Embodiments with a general bus interface are possible and contemplated. LS BIU 106 in the embodiment shown is configured to interface with, e.g., a memory bus for performing loads of data from memory and stores of data to memory. IBIU 107 is configured for accessing instructions from memory, which may be forwarded to, e.g., a fetch unit in the pipeline. LS BIU 106 is configured to assert a corresponding busy signal, LS Busy for LS BIU 106 when involved in a pending transaction. IBIU 107 is similarly configured to assert the IBIU signal when involved in a pending transaction. These signals may remain in an asserted state until the transaction that triggered their assertion is complete. Accordingly, when either of these signals are asserted, processor 100 is not considered to be in a quiescent state. More generally, whenever a particular transaction is pending, e.g., a transaction that involves a bus interface unit of some type, a processor according to this disclosure is considered to not be in a quiescent state.

Processor 100 in this particular embodiment also includes a load CAM (content addressable memory) 108. Load CAM 108 may store data that has been loaded from memory but not yet used (e.g., operands for particular instructions).

As previously noted, presence of one or more pending transactions may prevent retire logic unit 105 from halting the operation of processor 100, e.g., responsive to a halt request from debug circuit 110. In particular, if a transaction is pending (e.g., as indicated by a busy signal from LS BIU 106 or IBIU 107), processor 100 in the embodiment shown is not considered to be in a quiescent state, and may thus be prevented from halting operation. The present disclosure contemplates that there can be a number of different reasons why a processor is considered to not be in a quiescent state, and thus the reasons discussed here are provided by way of example. However, retire logic unit 105 of processor 100 in the embodiment shown is configured to cause the processor to halt even in the event of pending transactions at the time of the halt request. In particular, retire logic 105 in the embodiment shown is configured to force processor 100 into a quiescent state and halt operation even if transactions are pending when the halt request is submitted.

Retire logic 105 in the embodiment shown includes a programmable timer 125. In the event there are pending transactions when a halt request arrives, timer 125 begins running up to a set amount of time. This time may be programmed and set in a register that, in one embodiment, is one of the registers in control/status registers 120. A description of the fields in this register for one processor embodiment is shown below in Table 1.

TABLE 1

| Field | Bits | Description | Access | Reset |
|---|---|---|---|---|
| Reserved | 31:6 | Reserved | R | 0 |
| Threshold | 5:1 | Power-of-Two Exponent of timeout threshold ($2^{thresh}$ clock cycles) | R/W | 0 |
| Enable | 0 | Enable/Disable Forced Debug Halt Timeout<br>0: Timeout Mechanism Disabled<br>1 Timeout Mechanism Enabled | R/W | 0 |

In the example shown above, the corresponding register is a 32-bit register, with bits 31:6 being reserved. Bits 5:1 in the embodiment shown set the value of a power-of-two exponent that determines the amount of time that timer 125 may be allowed to run before retire logic unit 105 forces a halt (other specifications of the time value are possible as well). The enable bit, in bit position 0, is used to enable the operation of timer 125.

Programming a value for timer 125 may, in one embodiment, be determined based on an amount of time that a user determines a transaction should be pending. After a certain amount of time, if a transaction has not been completed, it is likely that the transaction will remain incomplete. Accordingly, the programmable value may be input into the register exemplified by Table 1 based on this value. If a halt request is received and the timer elapses, retire logic unit 105 may assert signals that cause a cancellation of the transaction(s) currently pending. This may be accomplished in this particular embodiment by sending a reset signal to LS BIU 106, IBIU 107, and load cam 108. This resets the bus interface units, and may also do the same for load CAM 108. After resetting these units, another register in control/status register 120 may be updated, an embodiment of which shown below in Table 2:

TABLE 2

| Field | Bits | Description | Access | Reset |
|---|---|---|---|---|
| Reserved | 31:2 | Reserved | R | 0 |
| LSU | 1 | Load/Store Unit Bus Transaction Termination Status: 0: No Prematurely terminated transactions 1: One or more transactions have been prematurely terminated | R/W | 0 |
| IFU | 0 | IFU bus transaction termination status: 0: No transactions have been prematurely terminated 1: One or more transactions have been prematurely terminated | R/W | 0 |

In the example provided above, the pertinent register includes reserved bits 31:2 (of a 32-bit register). Bit 1 in the register may be set to a value of a logic 1 if one or more transactions were terminated involving LS BIU 106. If no pending transactions were terminated, the value is set to a logic 0. Bit 0 applies to IBIU 107, and is similarly configured, with a logic 1 corresponding to one or more prematurely terminated transactions, while a logic 0 indicates that no transactions were prematurely terminated. A logic 1 in either of these fields may further indicate that processor 100 was forced into a quiescent state by, e.g., the cancellation of transactions. Furthermore, a logic 1 in either of these fields may provide information as to which bus was stuck at the time of the halt request. After subsequent entry into the debug mode, debug circuit 110 may access this register and read this information out to the external debugger to be provided to a user. It is noted that similar registers may be present in other embodiments where different and/or additional mechanisms may be used to force processor 100 into a quiescent state such that operation can be halted by retire logic unit 105.

It is noted that if all pending transactions complete prior to the programmed time expiring, retire logic 105 can cause the processor to halt operation without performing a reset of LS BIU 106, IBIU 107, and load CAM 108. Instead, retire logic unit 105 may prevent any additional transactions from being generated and, more generally, prevent any operations from occurring that would prevent processor 100 from being in a quiescent state. Furthermore, if the halt request arrives and no transactions are pending and processor 100 is in a quiescent state, retire logic unit 105 may carry out the halting of operation without the delay that may be incurred by waiting for transactions to complete or the time indicated by timer 125 to expire.

Generally speaking, retire logic unit 105 may be configured, in various embodiments, of performing any type of reset operation and/or cancelling any type of transaction that may be a condition for putting processor 100 into a quiescent state and thus halting operation.

Once retire logic unit 105 has completed the forcing of processor 100 into quiescence, a halt acknowledgement is provided to debug circuit 110. At this point, control of processor 100 may effectively be handed over to debug circuit 110, and thus, by extension, to the external debugger. Thereafter, under the direction of debug circuit 110, various operations may be carried out. These operations can include, but are not limited to, conveying contents of various registers in processor 100 to the external debugger, causing instructions to be executed in a single step manner or in small groups, forcing the processor into a desired state, and so on. Generally speaking, in the debug mode, debug circuit 110, and by extension and external debugger, may perform a wide variety of operations to enable analysis of processor operation and debugging of faults that may occur during the execution of programs.

Processor Architecture Overview

Figure 2:
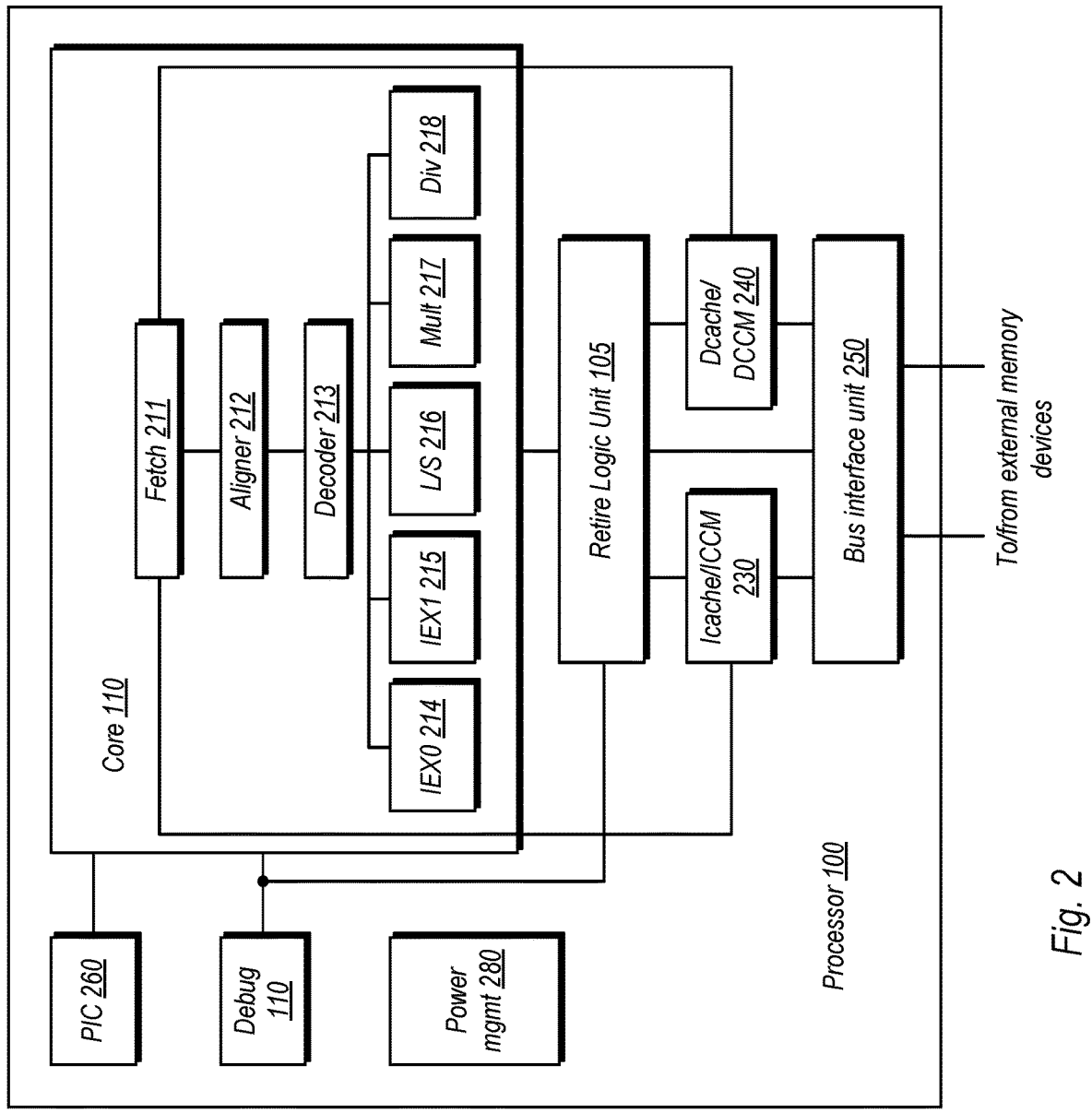
FIG. 2 is a block diagram further illustrating one embodiment of a processor.

FIG. 2 illustrates an embodiment of a processor 100 organized according to a particular microarchitecture. In some embodiments, processor 100 is configured to implement the RISC-V instruction set architecture (ISA), although other embodiments may implement other suitable ISAs. Preliminarily, it is noted that the microarchitecture shown in FIG. 2 represents merely one possible and non-limiting implementation. Processor 100 of the embodiment shown includes a retire logic unit 105, the circuitry of which may be configured in the same manner as shown in FIG. 1B. Furthermore, although not explicitly shown in this drawing, processor 100 may incorporate the other functionality discussed in FIG. 1B, including a debug circuit 110.

It is further noted that while FIG. 2 illustrated one example of a processor architecture, it is not intended to limit the disclosure. Generally speaking, various embodiments of the techniques and mechanisms for forcing a processor into quiescence to enable debugging operations as discussed elsewhere herein may be applied to virtually any type of processor architecture. It is further contemplated that various embodiments of the techniques and mechanisms for forcing a processor into quiescence to enable debugging operations as discussed elsewhere herein may be applied to any type of integrated circuit (e.g., application specific integrated circuit, or ASIC) in which debug operations may be carried out.

In the illustrated embodiment, processor 100 includes an execution core 210 that includes a number of circuits configured to perform various aspects of instruction execution. In particular, core 210 includes a fetch circuit 211 coupled to an aligner circuit 212, which is in turn coupled to a decoder circuit 213. Decoder circuit 213 is coupled to a number of instruction execution circuits, including first and second integer execution circuits respectively denoted IEX0 214 and IEX1 215, along with load/store circuit 216, multiplier circuit 217, and divider circuit 218. Additionally, processor 100 includes a retire logic unit 105, an instruction cache 230, a data cache 240, a bus interface unit 250, a programmable interrupt controller 260, a debug circuit 110, and a power management circuit 280.

Generally speaking, core 210 may be configured to fetch instructions and necessary data, execute instructions, and write results either locally (e.g., to a register file) or into a memory subsystem. In particular, fetch circuit 211 may be configured to initiate this process by retrieving instructions for execution. In various embodiments, fetch circuit 211 may be configured to implement program counter logic and branch prediction circuitry in order to track the flow of program execution and attempt to predict the outcome of conditional branches in order to speculatively fetch branch targets. For example, fetch circuit 211 may implement a "gshare"-style branch predictor in which a table of branch direction predictors is used in combination with a branch target buffer (i.e., a cache of branch target addresses) along with the current program counter and an indicator of global branch history to generate a predicted address from which to fetch instructions. Any suitable branch prediction scheme may be employed, however.

The fetch address generated by fetch circuit 211 may be directed to instruction cache 230. In some embodiments, instruction cache 230 may be implemented as a pipelined, banked, set-associative cache that is accessed by performing an index lookup and a tag comparison to verify that the fetch address is in fact present in the cache. In the event of a cache miss, the fetch address may be sent to bus interface unit 250 to be retrieved from external memory coupled to processor 100. In other embodiments, an instruction closely-coupled memory (ICCM) may be provided in addition to or instead of instruction cache 230. Generally speaking, a CCM is a storage array defined by a directly addressable region of memory addresses; it differs from a cache in that there is no possibility of an access "missing" a CCM and thus having a variable latency depending on its hit/miss status. A CCM may thus provide storage that has relatively low access latency that is also predictably consistent, unlike a cache, which may improve the performance of certain computing workloads such as real-time applications. In some embodiments, an instruction read-only memory (IROM) may be provided in addition to or instead of an ICCM; an IROM may provide similar access timing characteristics as an ICCM but has fixed contents (e.g., determined at the time of manufacture) and cannot be written to.

In some ISAs, instructions may have variable lengths. For example, the RISC-V ISA defines a set of 32-bit instructions as well as 16-bit "compressed" variants of a subset of the 32-bit instructions. Accordingly, in some embodiments, aligner circuit 212 may be configured to identify instruction boundaries within the fetch stream and extract the corresponding instructions for further processing. For example, aligner circuit 212 may be configured to identify RISC-V 16-bit compressed instructions and convert them to their uncompressed 32-bit variants for downstream processing, which may simplify later processing relative to preserving the compressed instructions in their native format.

Decoder circuit 213 may be configured to receive fetched instructions from aligner circuit 212 and decode them in order to determine how they should be further processed within core 210. For example, decoder circuit 213 may examine the operand fields of instructions in order to determine instruction dependencies that may dictate when an instruction is ready to execute; if an instruction requires a result that is not yet available, decoder circuit 213 may delay its execution (and possibly the execution of upstream instructions) until its dependencies are satisfied. In some embodiments, decoder circuit 213 may attempt to group multiple instructions for concurrent execution. To simplify the complexity of this task, some embodiments of decoder circuit 213 may limit the number of instructions issued for concurrent execution. For example, although core 210 includes multiple execution units that could in theory operate concurrently, these execution units may be grouped such that only two instructions are issued per cycle by decoder circuit 213. In other embodiments, however, such limitations may not apply.

In some embodiments, decoder circuit 213 may implement additional operations. For example, decoder circuit 213 may detect synchronization attributes of particular instructions (e.g., instructions that may have special execution timing requirements relative to other instructions in order to ensure correct execution) and appropriately stall or freeze the execution pipeline in order to enforce those attributes. In some instances, decoder circuit 213 may also include a register file configured to implement the architected registers defined by the ISA and/or control/status registers defined by the ISA or the particular processor implementation, although these features may alternatively be implemented elsewhere within core 210.

Once processed by decoder circuit 213, instructions may then be issued to the appropriate execution circuit for execution. In the illustrated embodiment, core 210 includes two integer execution circuits IEX0 214 and IEX1 215, each of which may implement circuitry for executing arithmetic, logical, and shift instructions defined by the ISA. In the illustrated embodiment, IEX0 214 and IEX1 215 are each configured to implement two arithmetic/logic units (ALUs), for a total of four ALUs. As will be discussed below with respect to FIG. 2, the ALUs in each execution circuit may be configured to operate in successive pipeline stages rather than concurrently, in order to facilitate bypassing of results from one execution circuit to another.

In addition to the integer execution circuits, load/store circuit 216 may be configured to execute load and store instructions defined by the ISA. For example, load/store circuit 216 may be configured to perform address generation arithmetic and to present the resulting address to data cache 240 for processing. In some embodiments, like instruction cache 230, data cache 240 may be implemented as a pipelined, banked, set-associative cache that is accessed by performing an index lookup and a tag comparison to verify that the address targeted by the load or store instruction is in fact present in the cache. In the event of a data cache miss, the address may be sent to bus interface unit 250 to be retrieved from external memory coupled to processor 100. In some embodiments, a data closely-coupled memory (DCCM) may be provided in addition to or instead of data cache 240. As noted above, a CCM may effectively operate as a directly addressable on-chip memory with predictable access latency, in contrast to a cache that has a variable, probabilistic access latency. In embodiments that implement only a DCCM without a data cache, accesses within the memory range associated with the DCCM may be routed to the DCCM, whereas accesses outside of that range may ultimately be handled by bus interface unit 250.

Multiplier circuit 217 may be configured to implement integer multiplication instructions defined by the ISA. Divider circuit 218 may be configured to implement integer division instructions defined by the ISA. While multiplier circuit 217 may be pipelined, integer division is typically a complex, long-latency operation. Accordingly, in the illustrated embodiment, divider circuit 218 is implemented as a non-pipelined circuit, and instructions dependent on the results of an integer division instruction will stall until the division is complete. It is noted that while floating-point arithmetic is not explicitly discussed above, embodiments of core 210 may include execution circuits that support such operations.

As shown in FIG. 2, processor 100 includes retire logic unit 105 interposed between core 210 and other elements of the memory hierarchy, such as instruction cache 230, data cache 240, and bus interface unit 250. Retire logic unit 105 may perform functions such as those discussed in reference to FIGS. 1A and 1B. This may include retiring instructions, committing results to registers, and so on. Retire logic unit 105 may also include a timer as shown in FIGS. 1A and 1B, and may be arranged to cancel pending transaction and/or force processor 100 into a quiescent state to enable entry into a debug mode.

Bus interface unit (BIU) 250 may be configured to interface processor 100 with other devices, such as memory, input/output devices, or other peripherals. External devices may either be on-chip (e.g., on the same silicon as processor 100, as in a system-on-a-chip (SoC) implementation) or off-chip. In some embodiments, BIU 250 may interface with external devices according to a version of the Advanced Microcontroller Bus Architecture (AMBA) standard, such as the Advanced High-performance Bus (AHB) bus protocol introduced in the AMBA 2 specification. Any other suitable bus architecture or protocol may be employed, however. BIU 250 may include circuits such as load and store queues configured to store pending load and store instructions as well as state machines or other circuits configured to implement the appropriate bus transaction logic.

In some embodiments of processor 100 that include an ICCM and/or a DCCM, these memory structures may be accessible via direct memory access (DMA) by off-processor devices in addition to being accessed by instructions executing in core 210. In such embodiments, processor 100 may include arbitration circuitry configured to arbitrate competing ICCM/DCCM accesses originating from processor 100 and DMA. For example, processor accesses may generally take priority over DMA accesses, although the arbitration circuitry may employ fairness and/or performance factors to ensure that DMA accesses are eventually serviced. In some embodiments, an ICCM/DCCM may be implemented in a banked manner with arbitration being performed on a per-bank basis, so that different banks may concurrently service accesses from processor 100, DMA, or a combination of these.

Programmable interrupt controller (PIC) 260 may be configured to facilitate the processing of interrupts originating externally to processor 100, such as asynchronous interrupts from peripherals that need to perform input/output. In various embodiments, PIC 260 may implement circuitry configured to prioritize and mask interrupts according to user-programmable specifications, to support vectoring of interrupts to corresponding dedicated interrupt handler locations in memory, to support nesting and chaining of concurrent or successive interrupts, or any other suitable interrupt-related processing. In some embodiments, PIC 260 may process exceptions or faults arising from instruction execution within core 210 in addition to external interrupts.

Debug circuit 110 may be configured to implement a variety of debug-related features. For example, RISC-V defines an extensive debugging interface that can enable software to inspect and control the operation of processor 100 at a fine level of granularity. To support these features, debug circuit 110 may implement features such as breakpoints, timers, or other event-related triggers that, for example, facilitate pausing of instruction execution when defined events are detected, so that a user can inspect the state of processor 100 and associated memory at that time. Such features, along with features such as single-step execution, may facilitate the debugging of software executing on processor 100.

Some features of debug circuit 110 may also be used to perform hardware debug/test, for example as part of a silicon development or manufacturing test scenario. For example, debug circuit 110 may implement a command interface that may be accessible either via software or via hardware test features such as JTAG ports. The command interface may enable a user to read and/or write state elements within processor 100, such as register files, memory arrays, and the like. Thus, debug circuit 110 may facilitate the injection of test code into processor 100 in order to verify or debug a partially-operative hardware system.

Lastly, power management circuit 280 may be configured to coordinate power management features across processor 100. For example, power management circuit 280 may be configured to implement support for architecturally-defined power management states and to correctly transition processor 100 across those states, e.g., by controlling the sequence in which circuits of processor 100 are energized or depowered. Power management circuit 280 may also be configured to implement other power management features that are not necessarily architecturally defined, such as detecting and depowering idle circuits in order to decrease power consumption.

Overview of Debug Architecture

As discussed above, in some embodiments the disclosed techniques may be performed in the context of the RISC-V architecture, which may be incorporated into various embodiments of the processor discussed above It is noted that this drawing is provided by way of example, and is not intended to limit the disclosure to any particular architecture or any particular debugging arrangement. Various embodiments of the techniques and mechanisms for forcing a processor into a quiescent state to enable entry into a debug mode may be carried out on a wide variety of processors, processor architectures, and other types of integrated circuits.

Figure 3:
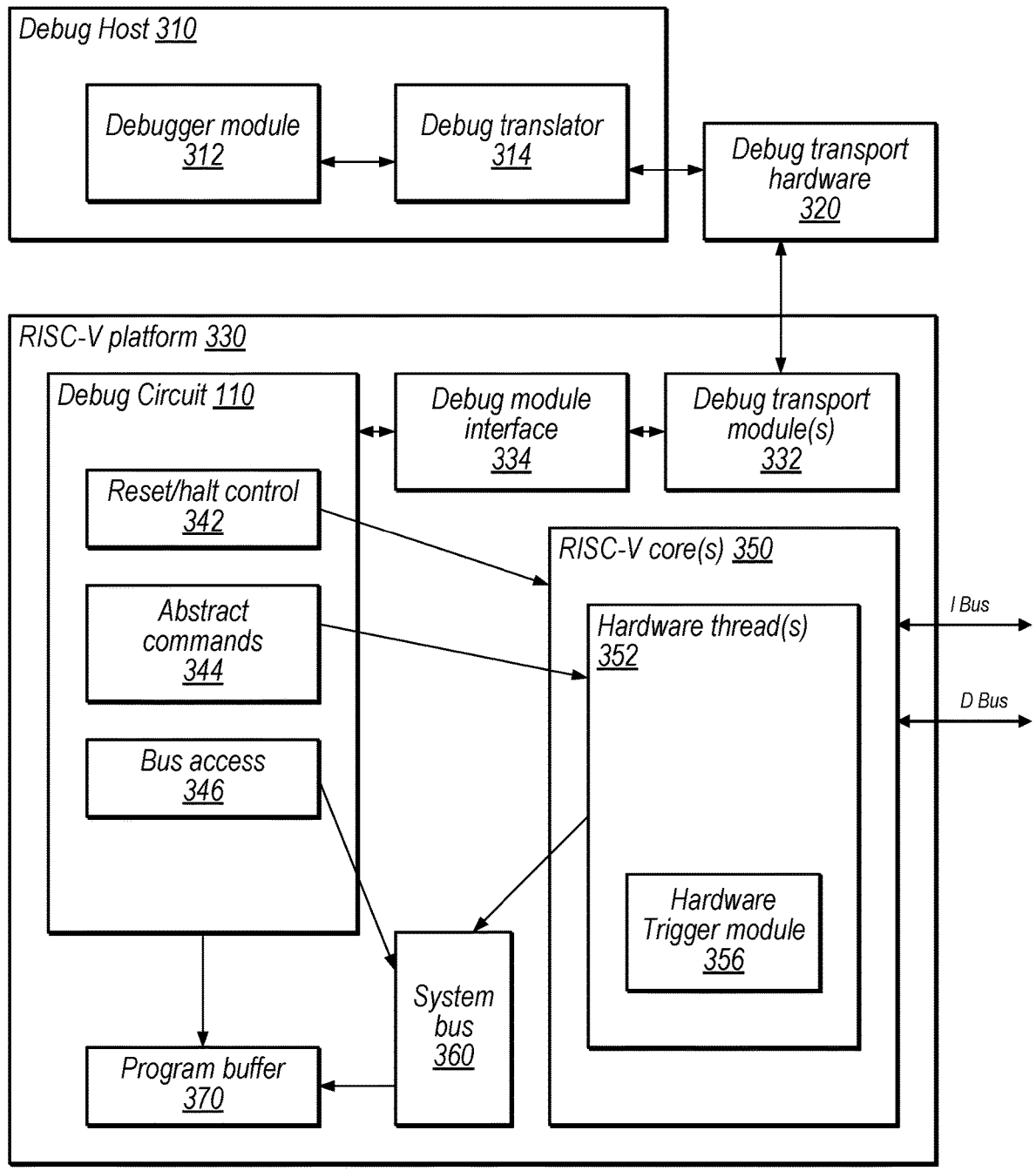
FIG. 3 is a block diagram further illustrating a debugging architecture for one embodiment of a processor.

FIG. 3 is a block diagram based on FIG. 2.1 of version 0.13.1 of the RISC-V External Debug Support specification. In some embodiments, a user interacts with the debug host 310 (e.g., a laptop computer) that runs a debug module 312 such as gdb. The debug translator 314 (e.g., openOCD) communicates with debug transport hardware 320 (e.g., a USB-JTAG adapter) which connects to one or more debug circuits 110 (one of which is shown here) on the RISC-V platform 330 (e.g., via debut transport module(s) 332 and debug module interface 334). Generally speaking, debug host 310 and/or debug transport hardware 320 may be referred to as hardware comprised in an external debugger that is used to communicate with debug circuit 110 within the processor. Using this external hardware, a user can relay commands to debug circuit 110 and extract information from the processor that provide insight into the execution of software, aid in troubleshooting, and in at least some cases, identify the causes of faults and malfunctions.

In the illustrated embodiment, debug circuit 110 communicates with RISC-V core(s) 350 using reset/halt control module 342, abstract commands module 344, and bus access module 346. As shown, debug circuit 340 may send reset/halt control signaling and abstract commands to the cores and may also access system bus 360 and program buffer 370. The reset/halt control signaling may include a halt request sent by debug circuit 110 to a retire logic unit 105 (e.g., of FIGS. 1 and 2) to cause a halt of processor operation to enable entry into a debug mode. Debug circuit 110 is also coupled to receive a halt acknowledgement signal indicating that the processor operation has been halted and that debug mode operations may commence.

The program buffer 370 may allow the debugger to execute arbitrary instructions and/or access memory. In some embodiments, the disclosed techniques do not use a program buffer, but the RISC-V core(s) 350 implements control units configured to convert abstract commands to other signaling (e.g., instructions or DMA commands). In other embodiments, the debug modules 340 may generate instructions for the program buffer based on abstract commands. Hardware debugging that does not use the program buffer may be advantageous relative to such software debugging, however, in certain instances, to avoid executing instructions during debug. In some embodiments, bus access module 346 allows the debug module to access memory (that is external to the processor core) without using a processor core.

The various functions carried out by debug circuit 110 in the debug mode also include accessing various system registers, access to a control/status register within retire logic unit 105, and relaying the information contained therein to debug host 310. Debug circuit 110 may also cause execution of instructions, either by single step execution (in which the processor halts after each instruction is executed) or small batches of instructions. Generally speaking, debug circuit 110 in the embodiment shown may have control over processor operations in the debug mode.

The RISC-V core(s) 350, in the illustrated embodiment, each implement one or more hardware thread(s) 352 which include a hardware trigger module 356. The trigger module may allow a core to halt and inform a debug circuit 110 when trigger conditions are met. The RISC-V core(s) 350 may include various elements of a processor as discussed above in FIGS. 1A-B and 2, but are otherwise not explicitly shown here. As also shown here, the RISC-V core(s) 350 may be connected to an instruction bus ('I Bus') and a data bus ('D Bus'). As noted above, the scope of the disclosure is not intended to be limited to RISC-V implementations, which are discussed here for the sake of example. Accordingly, non-RISC-V implementations in accordance with this disclosure are also possible and contemplated.

Example Computing System

Figure 4:
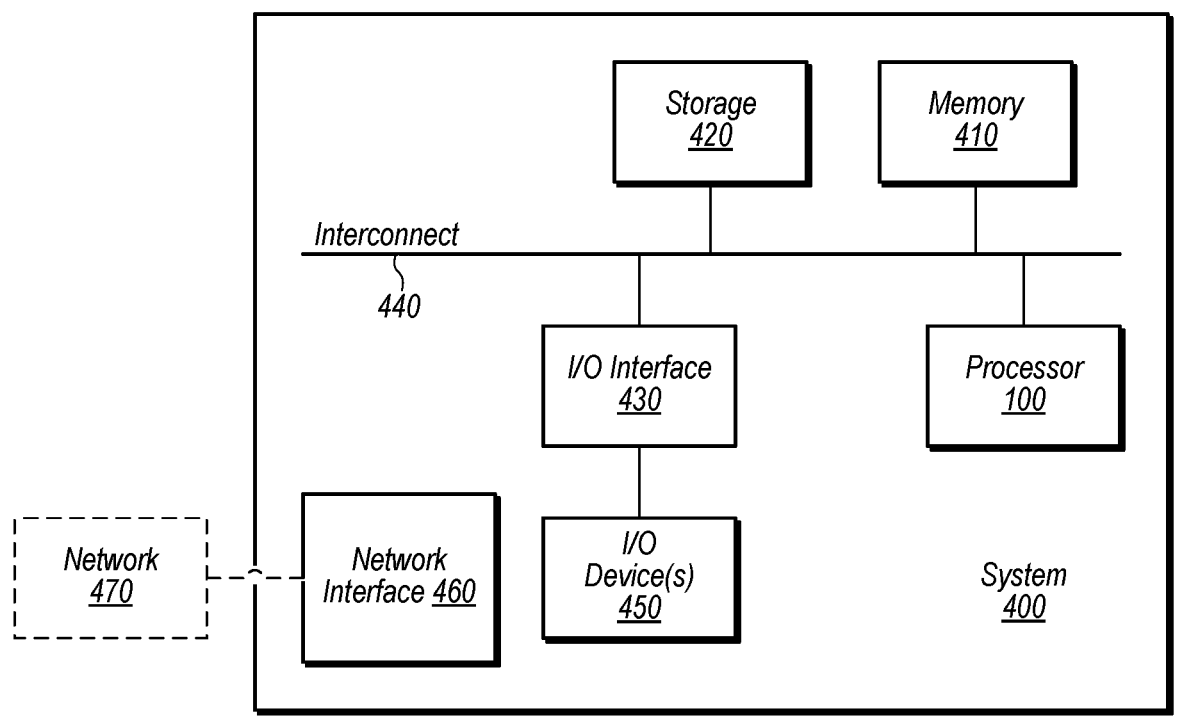
FIG. 4 is a block diagram of one embodiment of a computer system.

Processor 100 may be included within a variety of system configurations, one example of which is shown in FIG. 4. In various embodiments, system 400 may correspond to a general-purpose computer system, such as a desktop or portable computer, a mobile phone, or the like. System 400 may also correspond to any type of embedded system that may employ one or more instances of processor 100 as a dedicated controller. For example, system 400 may correspond to any type of computer peripheral device such as a mass storage device or storage array, printer, or the like, as well as control systems for automobiles, aviation, manufacturing, and other suitable applications.

As shown, system 400 includes processor 100, memory 410, storage 420, and an input/output (I/O) device interface 430 coupled via an interconnect 440. One or more I/O devices 450 are coupled via I/O interface 430. System 400 also includes a network interface 460 that may be configured to couple system 400 to a network 470 for communications with, e.g., other systems. (In various embodiments, network interface 460 may be coupled to interconnect 440 directly, via I/O interface 430, or according to a different configuration.) It is noted that some or all of the components of system 400 may be fabricated as a system-on-a-chip, although discrete combinations of components may also be employed.

Processor 100 corresponds to one or more instances of the processor configuration described above with respect to FIGS. 1A-3, or a suitable variant thereof. Memory 410 may include random access memory (RAM) of any suitable configuration, such as working memory configured to store data and instructions usable by processor 100. Storage 420 may include mass storage devices such as magnetic, optical, or nonvolatile/flash memory storage, or a combination of these. In some embodiments, either of memory 410 or storage 420 may be omitted or integrated into the other as a single memory subsystem from the perspective of processor 100.

I/O interface 430 may be configured to interface between interconnect 440 and one or more other types of buses or interfaces. For example, interconnect 440 may correspond to the AHB interface discussed above (or another suitable type of high-bandwidth interconnect), and I/O interface 430 may be configured as a bridge device that enables coupling of different types of I/O devices to interconnect 440. I/O interface 430 may implement one or more interface protocols such as Universal Serial Bus, Firewire, or other suitable standards. I/O device(s) 450 may include any suitable type of storage, network interface, user interface, graphics processing, or other type of device. Network 470, if present, may be any suitable type of wired or wireless communications network, such as an Internet Protocol (IP) addressed local or wide-area network, a telecommunications network, or the like. Network interface 460, if present, may be configured to implement any suitable network interface protocol needed for communication with network 470.

Method Flow Diagrams

Figure 5:
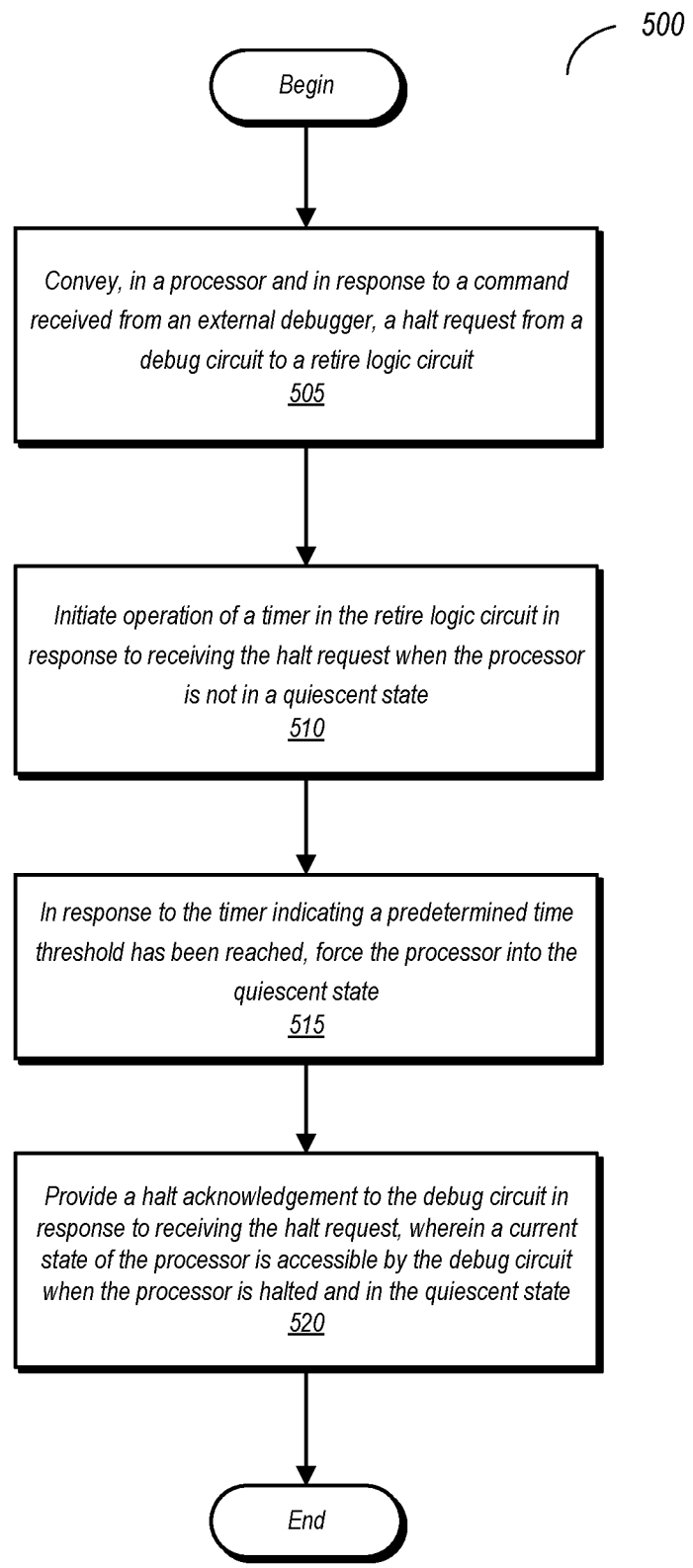
FIG. 5 is a flow diagram illustrating one embodiment of a method for forcing a processor to halt.

FIG. 5 is a flow diagram illustrating one embodiment of a method for forcing a processor to halt. In particular, Method 500 is directed to one embodiment of a methodology to force a processor into a quiescent state with operation halted in the event the processor hangs due to, e.g., a pending transaction not being completed. Method 500 may be carried out and performed on various embodiments of the circuitry discussed above. However, other hardware embodiments capable of carrying out Method 500, but not disclosed explicitly herein, are also considered to fall within the scope of this disclosure.

Method 500 includes conveying, in a processor and in response to a command received from an external debugger, a halt request from a debug circuit to a retire logic circuit (block 505). The method further includes initiating operation of a timer in the retire logic circuit in response to receiving the halt request when the processor is not in a quiescent state (block 510). In response to the timer indicating a predetermined time threshold has been reached, the method includes forcing the processor into the quiescent state (block 515). After forcing the processor into the quiescent state, the method further includes providing a halt acknowledgement to the debug circuit in response to receiving the halt request, wherein a current state of the processor is accessible by the debug circuit when the processor is halted and in the quiescent state (block 520).

The current state of the processor may include contents of one or more registers internal to the processor, and thus various embodiments of the method further comprise the debug circuit conveying the contents of the one or more registers to the external debugger. When operating in a debug mode, various method embodiments include the debug circuit controlling operation of the processor responsive to receiving the halt acknowledgement. Controlling operation may include, among other things, the debug circuit causing single-step execution of instructions in the processor.

Forcing the processor into the quiescent state in various embodiments includes the retire logic circuit canceling one or more pending transactions, wherein canceling the one or more pending transaction includes resetting one or more bus interface units. Various embodiments of the method further include updating a status register to indicate that the processor is in the quiescent state upon completing the cancellation of the pending transactions.

With regard to the timer, in various embodiments thereof, the timer is programmable. In such embodiments, the method includes programming the timer with the predetermined time threshold.

Figure 6:
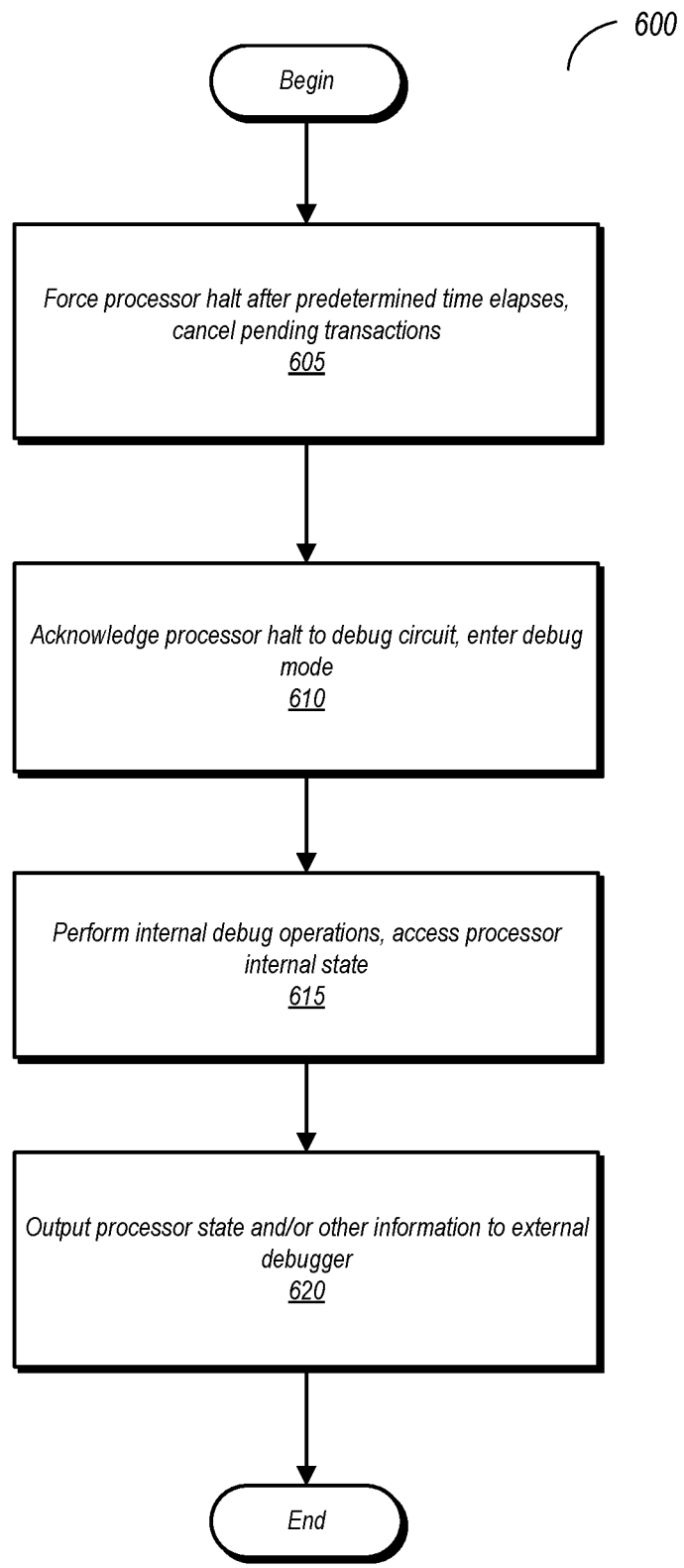
FIG. 6 is a flow diagram illustrating one embodiment of a method for conducting operations in a debug mode.

FIG. 6 is a flow diagram illustrating one embodiment of a method for conducting operations in a debug mode. Method 600 is directed to general operations that may be performed in a debug mode, and is not intended to be all-encompassing, nor is it intended to limit the disclosure.

Method 600 includes forcing a processor halt after a predetermined time elapses (from a halt request), and canceling any pending transactions (block 605). A halt request may be initiated when the processor ceases to operate ("hangs"). Among other situations, this may occur when a transaction between a processor and another entity on a bus fails to complete. If a transaction hasn't completed in a particular amount of time, it is likely that the transaction will never complete. However, the failure of the transaction to complete may prevent the processor from entering a quiescent state from which it can be halted. Accordingly, the pending transactions that are unlikely to complete may be canceled, thereby placing the processor into a quiescent state and allowing the processor to be halted. After the processor is halted, an acknowledgement of the processor halt is sent to a debug circuit and a debug mode is entered (block 610).

After entry into the debug mode, the debug circuit may perform internal debug operations including accessing the processor internal state (block 615). Accessing the processor internal state may include reading the states of various registers, both general purpose and special purpose. The internal state may also include the respective states of various circuits, storage circuits (e.g., flip-flops) and so on. Upon being accessed, the internal processor state and/or other information may be output to an external debugger (block 620), such as a laptop or other type of computer. The information may be studied by a user of the debugger to, e.g., enable analysis and troubleshooting of the fault that led to the initial hanging of the processor in the first place.

In some embodiments, debug operations may include executing instructions within the processor, e.g., by single-stepping instructions and outputting the processor state after each instruction is executed.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

Numerous variations and modifications will become apparent to those skilled in the art once the above disclosure is fully appreciated. It is intended that the following claims be interpreted to embrace all such variations and modifications.

What is claimed is:

1. An apparatus comprising:
a processor including:
a logic circuit configured to receive a halt request, wherein responsive to receiving the halt request while the processor is not in a quiescent state, the logic circuit is further configured to, after a predetermined amount of time has elapsed from receiving the halt request, force the processor to halt operation by forcing the processor into a quiescent state, wherein a current state of the processor is accessible by a debug circuit in the processor when the processor is halted and in the quiescent state, wherein the logic circuit is further configured to force the processor into a quiescent state by resetting one or more bus interface units.

2. The apparatus of claim 1, wherein the debug circuit is configured to generate the halt request responsive to receiving a command from a debugger external to the processor.

3. The apparatus of claim 1, wherein the logic circuit is further configured to provide an acknowledgement signal to the debug circuit to indicate that the processor has been forced into a quiescent state, and wherein the debug circuit is configured to control operation of the processor responsive to receiving the acknowledgement signal.

4. The apparatus of claim 1, wherein the logic circuit is further configured to force the processor into a quiescent state by canceling one or more pending transactions.

5. The apparatus of claim 1, wherein the logic circuit includes a timer configured to track an amount of time that has elapsed up after receiving the halt request up to the predetermined amount of time, wherein the predetermined amount of time is programmable.

6. The apparatus of claim 1, further comprising a status register, wherein responsive to forcing the processor into the quiescent state, the logic circuit is further configured to cause contents of the status register to be updated to indicate that the processor has been forced into the quiescent state.

7. The apparatus of claim 1, wherein the logic circuit includes a timer, wherein responsive to the logic circuit receiving the halt request, the timer is configured to begin operation and further configured to generate an indication that the predetermined amount of time has elapsed.

8. The apparatus of claim 1, wherein the current state of the processor includes contents of one or more registers internal to the processor.

9. The apparatus of claim 1, wherein the processor further includes an execution pipeline having at least one execution unit, wherein the logic circuit is coupled to the at least one execution unit and is configured to retire instructions executed by the at least one execution unit.

10. A method comprising:
conveying, in a processor and in response to a command received from an external debugger, a halt request from a debug circuit to a retire logic circuit;
initiating operation of a timer in the retire logic circuit in response to receiving the halt request when the processor is not in a quiescent state;
in response to the timer indicating a predetermined time threshold has been reached, forcing the processor into the quiescent state; and
providing a halt acknowledgement to the debug circuit in response to receiving the halt request, wherein a current state of the processor is accessible by the debug circuit when the processor is halted and in the quiescent state, wherein forcing the processor into the quiescent state comprises the retire logic circuit canceling one or more pending transactions, wherein canceling the one or more pending transaction comprises resetting one or more bus interface units.

11. The method of claim 10, wherein the current state of the processor includes contents of one or more registers internal to the processor, and wherein the method further comprises the debug circuit conveying the contents of the one or more registers to the external debugger.

12. The method of claim 10, further comprising the debug circuit controlling operation of the processor responsive to receiving the halt acknowledgement, wherein controlling operation includes the debug circuit causing single-step execution of instructions in the processor.

13. The method of claim 10, further comprising updating a status register to indicate that the processor is in the quiescent state.

14. The method of claim 10, wherein the timer is a programmable timer, and wherein the method further comprises programming the timer with the predetermined time threshold.

15. A processor comprising:
a debug circuit coupled to a debug interface, wherein the debug circuit is configured to generate a request to halt operation of the processor responsive to receiving a command received, through the debug interface, from a debugger external to the processor; a timer configured to, if the processor is not in a quiescent state, begin tracking an amount of time elapsed from a time the request was generated; and a retire logic circuit configured to, responsive to the timer indicating that a time threshold has been reached, cause the processor to halt operation and enter the quiescent state and further configured to provide, to the debug circuit, an acknowledgement indicating that the processor is in the quiescent state, wherein the retire logic circuit is configured to force the processor into the quiescent state by canceling one or more pending transactions, wherein canceling one or more pending transactions includes the retire logic circuit resetting one or more bus interface circuits.

16. The processor of claim 15, wherein the debug circuit is further configured to, subsequent to the retire logic circuit forcing the processor into the quiescent state, read contents stored in one or more processor registers and further configured to convey the contents to the external debugger.

17. The processor of claim 15, wherein the debug circuit is further configured to, subsequent to the retire logic circuit forcing the processor into the quiescent state, cause stepwise execution of instructions by an execution unit in the processor.

* * * * *